United States Patent [19]
Reed et al.

[11] Patent Number: 5,460,007
[45] Date of Patent: Oct. 24, 1995

[54] ICE LEVEL SENSOR FOR AN ICE MAKER

[75] Inventors: Michael A. Reed, Portsmouth, N.H.; Douglas J. Ely, North Andover, Mass.; Robert Farra, Acton, Mass.; Richard F. Topping, Westborough, Mass.

[73] Assignee: Arthur P. Little, Inc., Cambridge, Mass.

[21] Appl. No.: 267,567

[22] Filed: Jun. 28, 1994

[51] Int. Cl.$^6$ ............................... F25C 1/00; G01F 17/00
[52] U.S. Cl. ............................... 62/137; 73/149; 137/392; 340/612
[58] Field of Search ............................... 62/137; 187/392; 73/149, 304 C, 290 R; 340/612

[56] References Cited

U.S. PATENT DOCUMENTS

| | | | |
|---|---|---|---|
| 3,397,715 | 8/1968 | Fathauer | 62/137 X |
| 4,002,996 | 1/1977 | Klebanoff et al. | 137/392 X |
| 4,780,705 | 10/1988 | Beane | 73/304 C |
| 5,017,909 | 5/1991 | Goekler | 73/304 C X |

*Primary Examiner*—William E. Wayner
*Attorney, Agent, or Firm*—Foley & Lardner

[57] ABSTRACT

An ice level sensor includes three capacitive plates for sensing the level of ice cubes in an ice tray or ice bucket. The ice level sensor preferably includes a relay for turning off the ice maker when a particular ice level is reached. The three capacitive plates provide immunity to frost collection because frost will collect on all plates equally. Preferably, the capacitive sensor is positioned with one plate next to the ice bucket and two plates positioned above the ice bucket. Preferably, the ice sensor may be retrofitted to existing refrigerators by mounting the capacitor plates to the rear freezer wall, and connecting AC input wires to the ice maker through a relay in the capacitor sensor.

26 Claims, 5 Drawing Sheets

ICE LEVEL SENSOR FOR AN ICE MAKER

TECHNICAL FIELD

The present invention relates generally to ice makers, and more particularly to a non-contact or no-touch sensor for measuring the level of ice in an ice bucket.

BACKGROUND OF THE INVENTION

Ice makers are generally located in a freezer compartment or unit. The ice maker generally receives liquid water, waits an appropriate amount of time for the water to freeze and form ice cubes, and discharges the ice cubes into an ice tray or bucket. The ice cubes generally fall from the ice maker into the bucket which is also located in the freezer unit.

Prior art ice makers generally rely on a clock motor coupled with a cam mechanism or other electro-mechanical device to control the process of making ice cubes. For example, the clock motor and cam mechanism operate to control the reception of water and dumping of the ice cubes into the bucket. The cam mechanism may include adjustments for setting harvest rates for the ice cubes. Sophisticated ice makers may employ heating elements in the ice maker. The heating elements heat the just formed ice cubes just before they are discharged to the bucket so that the just formed ice cubes are easily extracted from the ice maker.

Ice makers also include a mechanical sensor which determines the level of ice cubes in the bucket. The mechanical sensor is configured to turn off the ice cube maker when a predetermined level of ice cubes in the bucket is reached so that the ice cubes do not overflow and spill out of the bucket. The mechanical sensor may turn off the ice cube maker by engaging a mechanical switch or the cam mechanism so that ice cubes are no longer produced by the ice maker.

The mechanical sensor generally includes a sense wire or bar and mechanical linkage. The mechanical linkage couples the sense wire to the ice maker, the cam mechanism, or other components which can turn the ice maker off. The sense wire is positioned inside the bucket at a predetermined level. At the start of each ice cube harvest cycle, the mechanical sense wire is forced up. The ice cubes are harvested and drop into the bucket. The mechanical sense wire is then lowered. When the level of ice cubes reaches the predetermined level, the ice cubes force the sense wire to remain in the up position. The moving of the sense wire is transmitted through the mechanical linkage to the ice maker. Generally, the mechanical linkage disables the cam mechanism so that the ice maker does not discharge ice cubes.

Mechanical sensors or touch sensors are often unreliable. The mechanical linkage and sense wire are susceptible to being jammed by ice cubes or other materials in the freezer unit. When the mechanical sensor is jammed, the movement of the sense wire and the mechanical linkage is obstructed so that the appropriate ice level cannot be sensed. Another problem is that ice cubes can impact the sense wire on their way into the bucket and deflect to another location outside the bucket. Also, freezer units which are consistently opened and closed are susceptible to frost build-up from the higher humidity in the room temperature or atmospheric air. The frost build-up often obstructs the movement of the sense wire and mechanical linkage.

Another disadvantage of mechanical sensors is that the sense wire and mechanical linkage must be mechanically calibrated to the predetermined level. Once the sense wire and mechanical linkage are set, they are often bumped, bent or otherwise accidentally adjusted as ice and other materials are stored and removed. Further, the bucket often bumps the sense wire and linkage as it is removed from the freezer unit.

Additionally, mechanical sensors are disadvantageous because they are bulky. The sense wire and mechanical linkage often obstruct the removal of the ice bucket from the freezer unit. The bucket must be carefully removed to avoid jarring the sense wire which is disposed within the bucket. Also, the sense wire and mechanical linkage require space which could be utilized for other components or items in the freezer unit.

Mechanical sensors are also disadvantageous because they are not easily replaceable. The sensor must be bolted to the freezer unit so that the sense wire is disposed within the bucket, and mechanically integrated with the existing linkage or ice maker for proper installation. This integration requires the sense wire or mechanical linkage to be mechanically coupled to the cam mechanism. These mechanical tasks make retrofitting existing ice makers with mechanical sensors very difficult and expensive.

Thus, there is a need for an ice level sensor which is not susceptible to jamming, does not obstruct the removal of the ice bucket, is easily calibrated, and can be easily installed in existing freezer units. More particularly, there is a need for a non-contact sensor for use with an ice maker which is not susceptible to the problems associated with prior art mechanical sensors.

SUMMARY OF THE INVENTION

The present invention relates to a control circuit for an ice cube maker which provides ice cubes to a bucket. The control circuit includes a capacitive sensor and a compare circuit. The capacitive sensor is configured to provide a sense signal related to the amount of ice cubes in the bucket. The compare circuit is coupled with the capacitive sensor to receive the sense signal. The compare circuit provides a full signal when the sense signal is above a predetermined threshold.

The present invention also relates to a freezer unit. The freezer unit includes an ice maker, a capacitive plate, and a control circuit. The ice maker provides ice cubes to an ice cube bucket which stores an amount of the ice cubes. The capacitive plate is located proximate the ice cube bucket and changes capacitance in response to changes in the amount of the ice cubes stored in the bucket. The control circuit is coupled with the ice cube maker and the capacitive plate. The control circuit monitors the capacitance of the capacitive plate and provides a control signal when the capacitance indicates a particular amount of the ice cubes are stored in the ice cube bucket.

The present invention also relates to an improved ice maker which has a bucket and a level sensor. The ice maker makes ice and provides the ice to the bucket. The ice maker receives a control signal from the level sensor. The level sensor provides the control signal when a level of the ice in the bucket exceeds a predetermined level. The ice maker is improved in that the ice level sensor is a non-contact sensor.

The present invention further relates to a method of installing a level sensor in a freezer unit. The level sensor includes a control circuit and capacitive plates, and the freezer unit includes AC power conductors, a bucket, and an ice maker having power input conductors. The method comprises the steps of affixing the capacitive plates proximate the bucket in the freezer unit, coupling the power input conductors of the ice maker to the control circuit, and coupling the AC power conductors to the control circuit.

The present invention advantageously provides a non-contact sensor which reliably provides a control signal when a particular amount of ice is in the bucket. The non-contact sensor is preferably a capacitance sensor which advantageously determines the level of ice in the bucket and is not susceptible to inaccuracies due to frost buildup in the freezer unit.

In one aspect of the present invention, the sensor may be easily retrofitted to existing ice makers without need to make mechanical connections to the existing ice maker. Preferably, the present invention may be retrofitted to an existing ice maker by only adjusting a connection to the power supply of the ice maker.

Additionally, the present invention advantageously remotely senses the ice level, thereby eliminating the need for bulky mechanical sensors which are prone to jamming and which obstruct access to the bucket.

BRIEF DESCRIPTION OF THE DRAWINGS

The invention will hereafter be described with reference to the accompanying drawings, wherein like numerals denote like elements, and.

DETAILED DESCRIPTION OF THE PREFERRED EXEMPLARY EMBODIMENT

Figure 1:
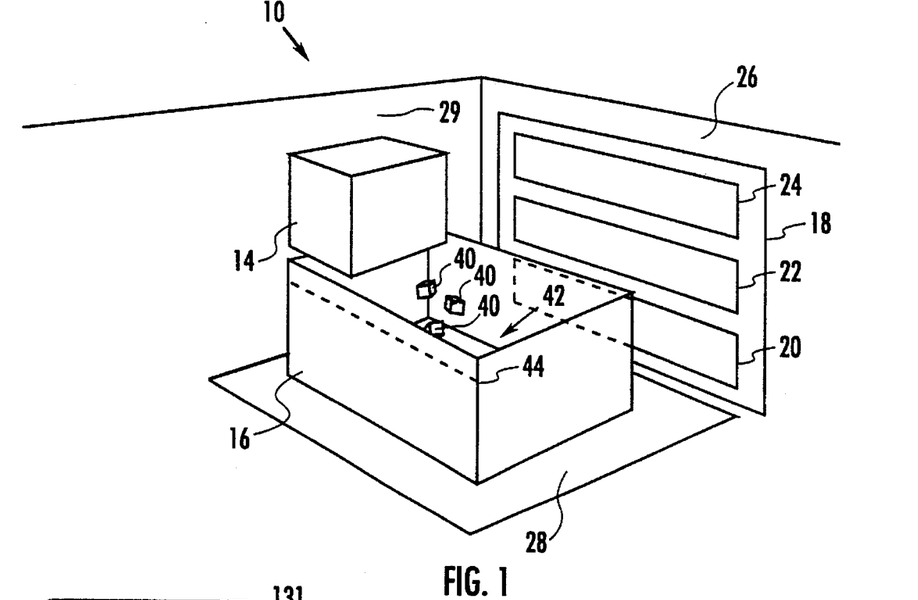
FIG. 1 is a perspective view schematic drawing of a freezer unit including a capacitive sensing module in accordance with a preferred exemplary embodiment of the present invention.

With reference to FIG. 1, a freezer unit 10 includes an ice maker 14, an ice bucket 16, and capacitive sensing module 18. Freezer unit 10 may be part of a household refrigerator, commercial freezer, dedicated ice maker, or in any device which includes an ice maker 14. Ice maker 14 is preferably mounted on a side wall 29 of freezer unit 10 and receives liquid water from a water source (not shown). Ice maker 14 waits a particular amount of time for the liquid water to freeze into ice cubes 40, and discharges ice cubes 40 into bucket 16, which is located on a shelf 28 in freezer unit 10. Ice maker 14 preferably generates ice cubes 40 until ice cubes 40 reach a particular level 44 in an interior 42 of bucket 16. Preferably, a control circuit (not shown in FIG. 1) operates to turn off ice maker 14 when ice cubes 40 reach level 44 so that ice cubes 40 do not overflow ice bucket 16.

Capacitive sensing module 18 is preferably mounted (screwed into or adhesively attached to) a back wall 26 of freezer unit 10, advantageously avoiding contact with components in freezer unit 10 such as ice maker 14 and bucket 16. Capacitive sensing module 18 also preferably has a thin profile so that a minimum amount of space is occupied. Capacitive sensing module 18 is preferably positioned proximate bucket 16 so that the capacitance associated with capacitive sensing module 18 changes as the level of ice cubes 40 in bucket 16 increases or decreases.

Capacitive sensing module 18 advantageously includes a capacitive plate 20, a capacitive plate 22, and a capacitive plate 24. Capacitive plate 20 is preferably positioned at the same horizontal level as bucket 16, and level 44 is at the same horizontal level as capacitive plate 22. Capacitive plate 24 is preferably positioned just above horizontal level 44 of bucket 16.

The capacitance of capacitive plate 20 preferably increases as ice cubes 40 fill bucket 16. More particularly, ice cubes 40 have a larger dielectric constant than air. Therefore, as bucket 16 is filled, the capacitance at capacitive plate 20 increases much more significantly than the capacitance associated with capacitive plates 22 and 24 due to the proximity of bucket 16 to capacitive plate 20. Thus, level 44 of ice cubes 40 in bucket 16 may be determined by sensing the capacitance associated with capacitive sensing modules 18.

Figure 2:
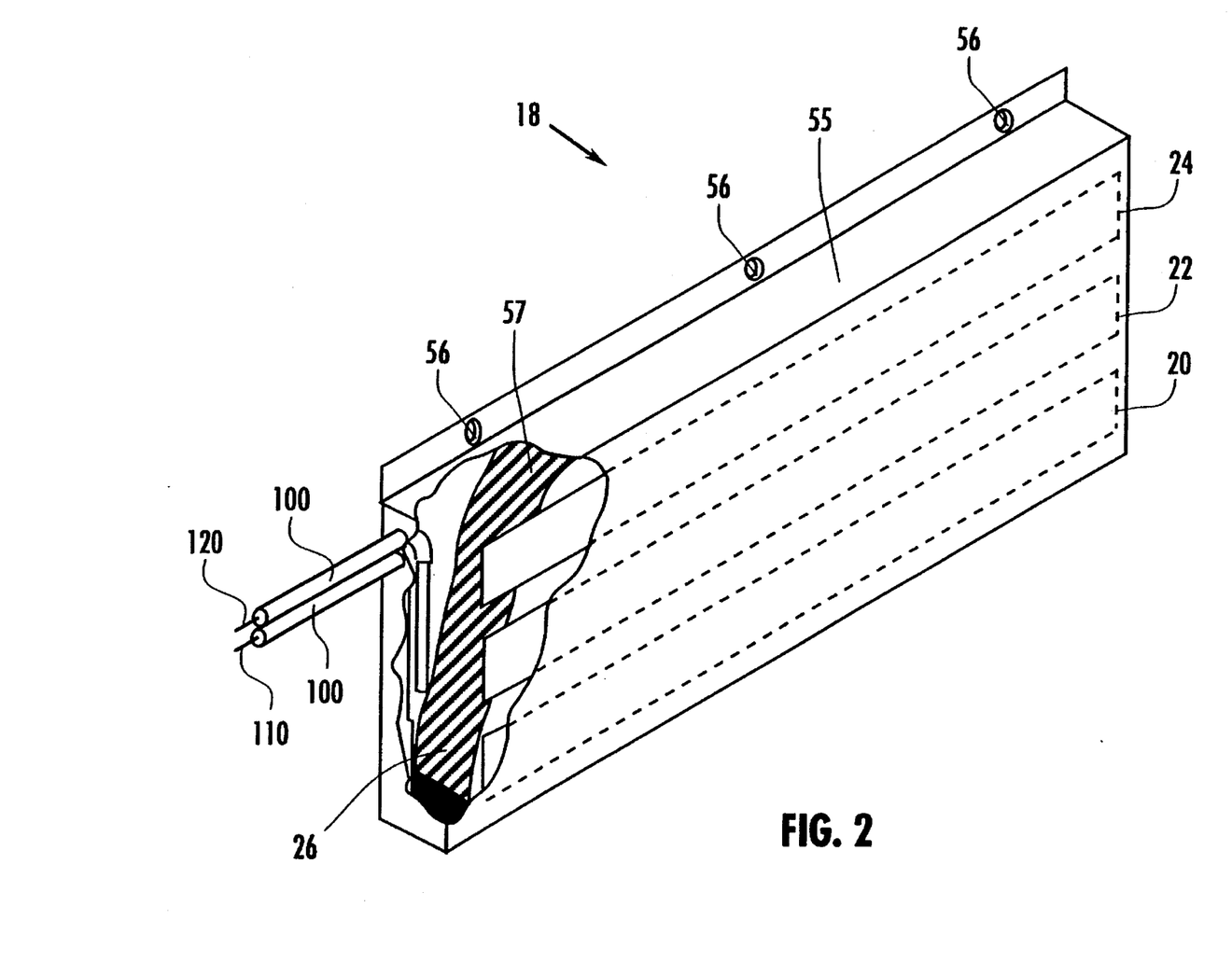
FIG. 2 is a more detailed schematic drawing of a partial sectional view of the capacitive sensing module illustrated in FIG. 1.

With reference to FIG. 2, capacitive sensing module 18 is encased in a plastic housing 55 such as acrylonitrile butadiene styrene (ABS) housing filled with foam insulation 57 such as urethane foam insulation. Preferably, capacitive plates 20, 22 and 24 are made from 0.005 inch thick stainless steel plates. Housing 55 is preferably 12 inches long and 6 inches high and includes coaxial connectors 110 and 120.

Outer conductor 100 of coaxial connectors 110 and 120 is coupled with a electrical ground. Coaxial connectors 110 and 120 preferably provide signals indicative of the capacitance associated with plates 20, 22, and 24. Coaxial connectors 110 and 120 advantageously provide noise immunity from components in the electrical environment of freezer unit 10 such as motors and power circuits.

Housing 55 preferably includes screws holes 56 for mounting to back wall 26 of freezer unit 10 (FIGS. 1 and 2). A control circuit (not shown in FIGS. 1 or 2) may be mounted within housing 55 or with other electronics in freezer unit 10. Preferably, the control circuit is located on a circuit board near the electrical power circuits associated with freezer unit 10.

Figure 3:
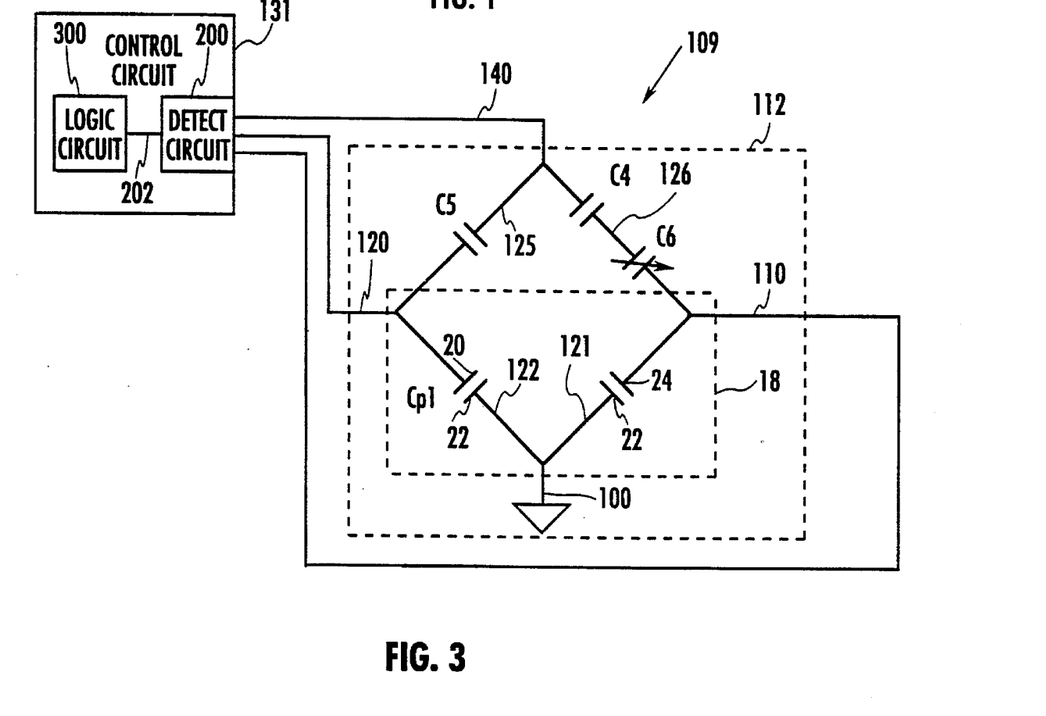
FIG. 3 is an electrical schematic diagram of a capacitive sensor including a control circuit and a capacitive bridge for use with the freezer unit illustrated in FIG. 1.

With reference to FIG. 3, a capacitive sensor 109 includes a control circuit 131 and a capacitive bridge 112. Control circuit 131 is coupled to capacitive bridge 112 via coaxial conductor 110, coaxial conductor 120, and conductor 140. Coaxial cable 120 is coupled with capacitive plate 20 and a first end of a capacitor C5. Capacitive plate 22 is coupled with ground wire 100. Capacitive plate 24 is coupled with coaxial cable 110 and a first end of an adjustable capacitor C6. A second end of adjustable capacitor C6 is coupled with a first end of a capacitor C4. A second end of capacitor C4 is coupled with a second end of capacitor C5 and conductor 140.

Capacitive bridge 112 includes capacitive sensing module 18. A first leg 122 of bridge 112 is comprised of capacitive plates 20 and 22; a second leg 121 of bridge 112 is comprised of capacitive plates 22 and 24. A third leg 125 of bridge 112 is comprised of capacitor C5, which has a capacitance value of 120 picofarads (pF). A fourth leg 126 of capacitive bridge 112 is comprised of capacitor C4 and adjustable capacitor C6. Adjustable capacitor C6 has a value from 3 to 40 picofarads, and capacitor C4 has a value of 100 picofarads. Capacitors C4, C5 and adjustable capacitor C6 are placed on a separate circuit board (not shown) which is utilized for control circuit 131.

Control circuit 131 includes a detect circuit 200 and a logic circuit 300. Detect circuit 200 provides a drive signal to capacitive bridge 112 on conductor 140 and receives a capacitive signal indicative of the amount of ice cubes 40 (FIG. 1) in bucket 16 across coaxial conductors 110 and 120. Detect circuit 200 provides a detect signal indicative of the amount of ice cubes 40 in bucket 16 across conductor 202 to logic circuit 300. Logic circuit 300 provides a control signal when the detect signal is above a predetermined threshold.

Figure 4:
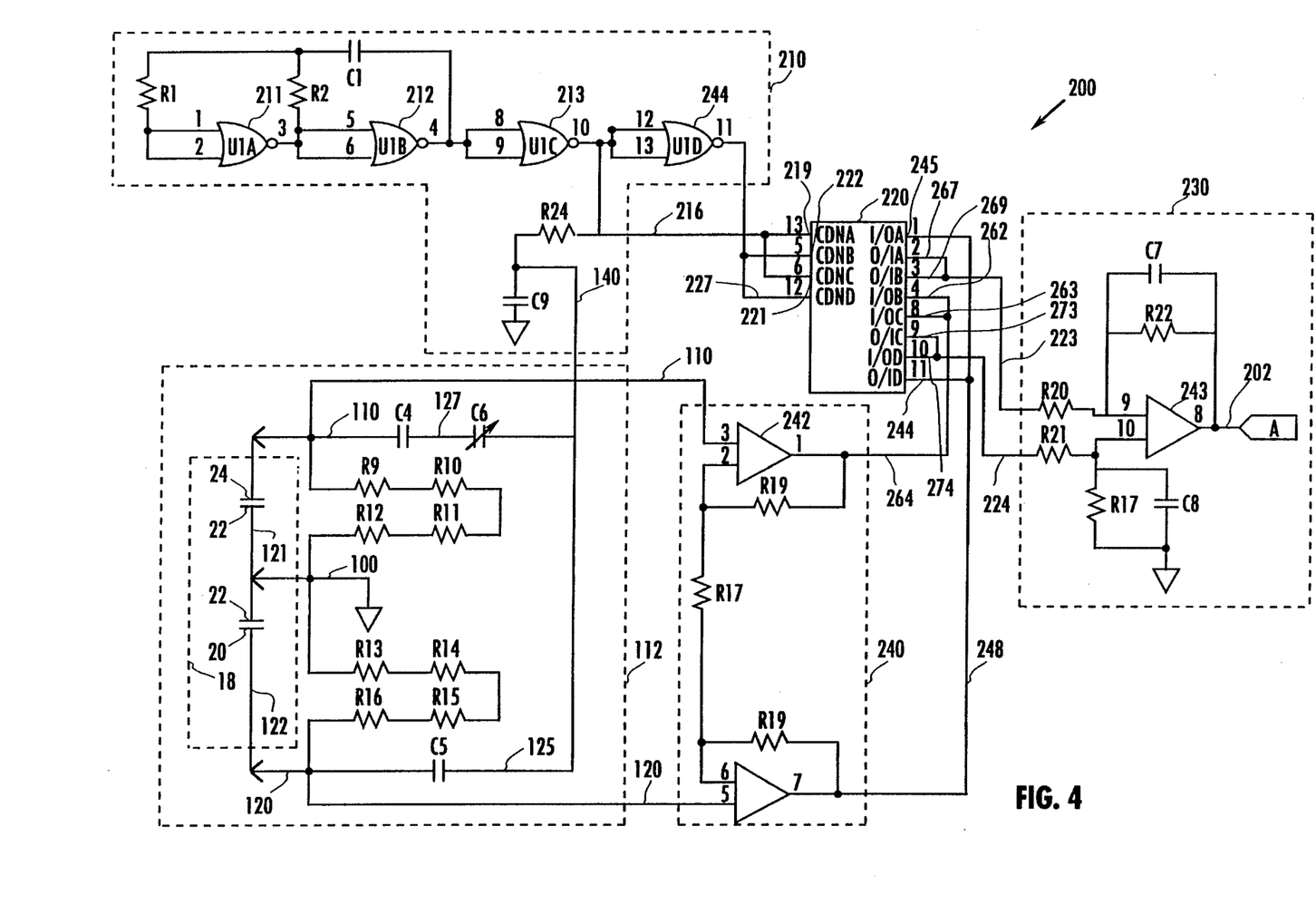
FIG. 4 is an electrical schematic diagram of a sense circuit in the control circuit of the capacitive sensor illustrated in FIG. 3.

With reference to FIG. 4, detect circuit 300 includes a drive circuit 210, a synchronous detector switch 220, and a differential amplifier output stage 230, and a differential amplifier input stage 240. Drive circuit 210 is coupled with capacitive bridge 112 via conductor 140, with a control input 219 and a control input 221 of synchronous detector switch 220 via a conductor 216, and with a control input 222 and a control input 227 via a conductor 217.

Differential amplifier input stage 240 is coupled to capacitive bridge 112 via coaxial connector 110 and coaxial connector 120. Differential amplifier input stage 240 is coupled to input 244 and an input 245 of synchronous detector switch 220 via a conductor 248 and is coupled to an input 262 and an input 263 via a conductor 264.

Differential amplifier output stage 230 is coupled to an output 267 and an output 269 of switch 200 via a conductor 223 and an output 273 and an output 274 via a conductor 224. Differential amplifier output stage 230 preferably provides the detect signal at conductor 202 to logic circuit 300 (not shown in FIG. 4).

Capacitive bridge 112 preferably includes sets of resistors coupled in series between coaxial conductor 110 and ground and coaxial conductor 120 and ground. Adjustable C6 allows adjustment and calibration of capacitive bridge 112. The capacitors which are part of bridge 112 provide balancing operations, and the resistors which are part of bridge 112 bleed the charge associated with the nodes of capacitive bridge 112. The resistors and capacitors are located proximate control circuit 131 separate from capacitive sensing module 18.

Drive circuit 210 includes a resistor R1, a resistor R2, a capacitor C1, a NOR gate 211, a NOR gate 212, a NOR gate 213, a NOR gate 214, a resistor R24, and a capacitor C9. Resistors R1 and R2 and capacitor C1 and NOR gates 211 and 212 are configured as an oscillator. NOR gate 212 preferably provides an oscillating signal (1 kHz) to an input of NOR gate 213. NOR gate 213 preferably operates as a buffer and generates a square wave signal at conductor 216.

The square wave signal is provided across resistor R24 to a conductor 140. Conductor 140 provides the square wave signal as a drive signal to capacitive bridge 112. Resistor R24 and capacitor C9 operate to filter out higher frequency signals. The square wave is also provided to NOR gate 244 which acts as a buffer and provides a second square wave at conductor 227. The second square wave is 180° out of phase from the square wave at conductor 216.

The drive signal at conductor 140 is received through fourth leg 127 and third leg 125 of capacitive bridge 112 by capacitive sensing module 118. The voltage at conductor 110 and the voltage at conductor 120 varies with the drive signal. When the capacitance associated with first leg 122 is equal to the capacitance associated with second leg 121 (bucket 16 is empty), the voltages at conductors 110 and 120 should be equal (balanced). However, as ice cubes 40 fill bucket 16, the capacitance of first leg 122 increases due to the increased capacitance of plate 20, and the voltage at conductor 120 falls below the voltage at conductor 110 (unbalanced). Thus, the voltage at conductor 110 and the voltage at conductor 120 indicate the balance between capacitive plates 20 and 24 with respect to capacitive plate 22. As ice cubes 40 in bucket 16 rise, the capacitance between plates 20 and 24 becomes more unbalanced and the difference between the voltages on conductor 110 and 120 increases.

The use of plates 20, 22 and 24 advantageously provides frost immunity for the sensing of the level 44 of ice cubes 40. Frost buildup generally occurs on all of plates 20, 22 and 24 equally. Therefore, the balance between the capacitance associated with plates 20, 22 and 24 is not affected by frost buildup.

The signals on conductors 110 and 120 are provided to differential amplifier output stage 240. Output stage 240 receives the signals on conductors 110 and 120 and provides buffered signals to detector switch 220 on conductors 248 and 264. The buffered signal on conductor 248 is provided to input 244 and input 245 of switch 220, and the buffered signal on conductor 264 is provided to input 262 and 263 of switch 220. Output stage 240 isolates the low level signals on capacitive bridge 118 and ensures that bridge 118 is not electrically loaded down.

Synchronous detector switch 220 is gated at control inputs 219 and 221 by the first square wave signal on conductor 216 from NOR gate 213 and is gated at control inputs 222 and 227 by the second square wave signal on conductor 217 from NOR gate 244. When the first square wave signal is a logic high (on control inputs 219 and 221), switch 220 provides the signal at input 245 to output 267 and the signal at input 263 to output 273. When the second square wave signal (on control inputs 222 and 227) are a logic high, switch 220 provides the signal on input 262 to output 269 and the signal on input 244 to output 274. Therefore, synchronous detector switch 220 provides unipolar detect signals on conductors 223 and 224. Output stage 240 amplifies the difference between the detect signals. The use of unipolar detect signals advantageously provides noise immunity. Switch 220 is preferably a quad bi-lateral switch (CD 4066BM manufactured by National Semiconductor, Inc.).

The first and second square wave signals on conductors 216 and 217, which are 180° out of phase, ensure that the difference between the signals on conductors 264 and 248 is provided by switch 220 as a single polarity signal (that is, the difference between the signals on conductors 224 and 223 is always a DC signal). As illustrated in FIG. 4, synchronous detector switch 220 is configured so that the signal on conductor 248 is provided as the signal on conductor 223 when first branch 122 and second branch 121 experience a positive pulse. Also, the signal on conductor 248 is provided as the signal on conductor 224 when first branch 122 and second branch 121 experience a negative pulse. Thus, switch 220 operates to reverse the connections of conductors 223 and 224 in response to the polarity of the drive signal so that switch 220 provides a unipolar signal on conductors 223 and 224 for reception by amplifier 230.

Differential amplifier 230 preferably provides a gain of 10 to the difference between the signals provided on conductor 223 and 224. Differential amplifier 230 preferably provides the amplified signal (the difference between the voltage on conductors 223 and 224) as the detect signal on conductor 202. Capacitor C7 and resistor R22 advantageously operate to provide low pass filtering for the amplified signal (detect signal). Low pass filtering provides noise rejection from the other components in the environment of freezer 10.

The detect signal is thus indicative of the difference in the capacitance in first leg 122 and second leg 121 (amount of ice cubes 40 in bucket 16). The greater the voltage of the detect signal, the greater the amount of ice cubes 40 in bucket 16. Conversely the smaller the voltage of the detect signal, the smaller the amount of ice cubes 40 in bucket 16.

Figure 5:
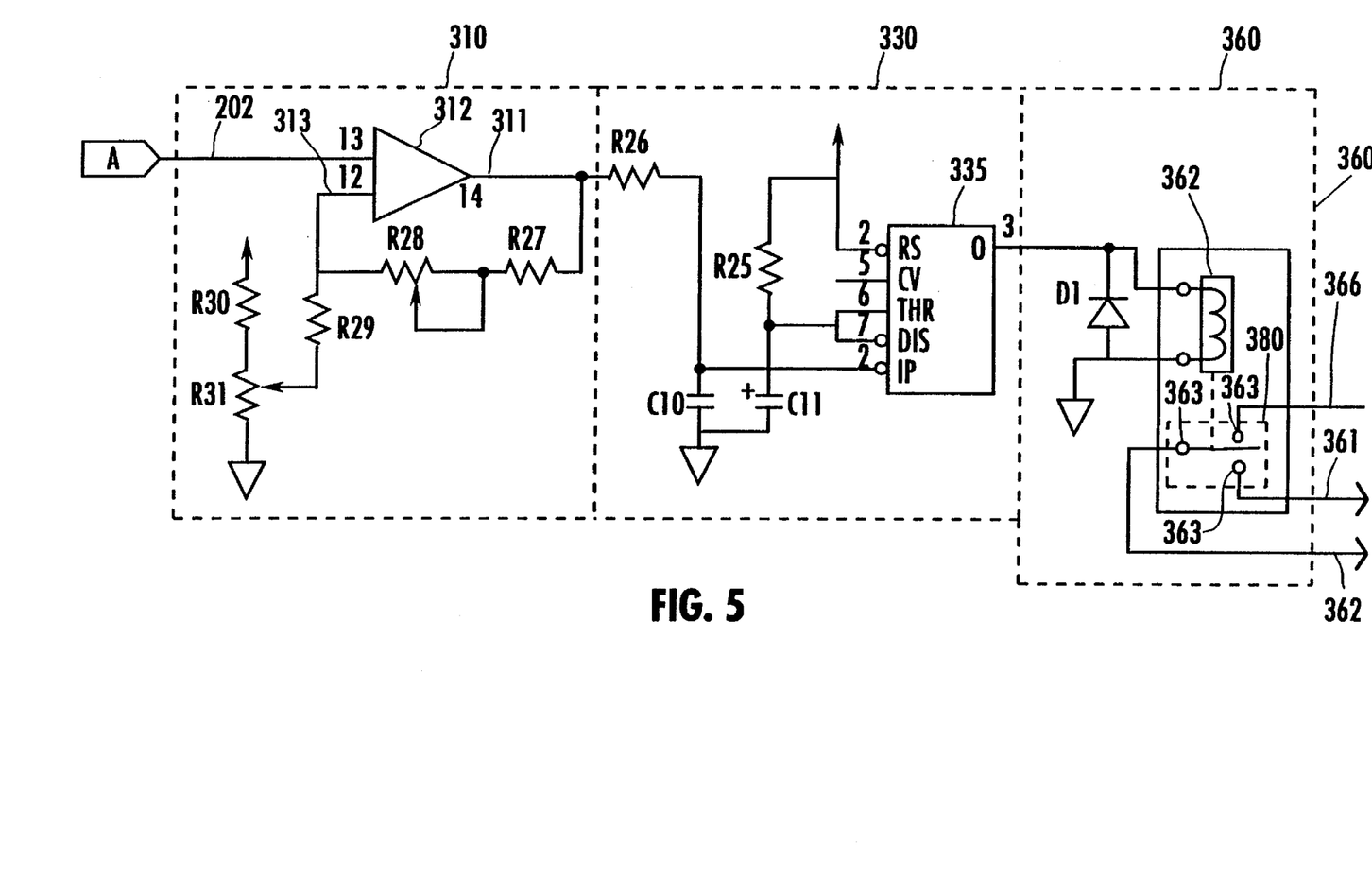
FIG. 5 is an electrical schematic diagram of a logic circuit in the control circuit of the capacitive sensor illustrated in FIG. 3.

With reference to FIG. 5, logic circuit 300 receives the detect signal at conductor 202. Logic circuit 300 includes a comparator 310, a timer circuit 330, and a relay circuit 360. Comparator circuit 310 is coupled to timer circuit 330 via a conductor 311. Comparator circuit 310 compares the detect signal to a predetermined threshold and generates a control signal if the detect signal is above a predetermined threshold (bucket 16 is full). The control signal is provided at a conductor 311 to timer circuit 330. Timer circuit 330 controls relay 360 in response to the control signal (full signal). The relay 360 is preferably configured to turn OFF ice maker 14. Relay 360 is preferably a normally open 12 VDC relay.

Comparator circuit 310 includes an operational amplifier 312, a resistor R26, a resistor R27, a potentiometer R28, a resistor R29, a potentiometer R31, and a resistor R30. Timer circuit 330 includes a resistor R25, a resistor R26, a capacitor C10, a capacitor C11 and a 555 timer 335. Relay 360 includes a diode D1, a coil 361, and a switch 380 having contacts 363.

Potentiometer R31 preferably provides the threshold voltage value or predetermined value at an input 313 indicative of level 44 in bucket 16 (FIG. 1). When the detect signal at conductor 202 is greater than the threshold provided by potentiometer R31 at input 313, operational amplifier 312 provides a logic low on conductor 311. Changing states from a logic high to a logic low on conductor 311 provides a descending edge to timer circuit 330. The descending edge triggers timer circuit 330.

The logic low at conductor 311 also pulls down the voltage at input 313 of amplifier 312 via resistor R27 and potentiometer 29. Hence, resistor 27 and potentiometer 29 provide a hysteresis circuit so that amplifier 312 locks itself in the logic low state. Amplifier 312 may be unlocked by partially emptying bucket 16 or otherwise resetting comparator 310. Partially emptying bucket 16 significantly lowers the capacitance associated with plate 20 and hence the detect signal at conductor 202. When bucket 16 is emptied, the detect signal is lower than the threshold at input 313 (the "pulled down" threshold) and amplifier 312 provides a logic high at conductor 311. The voltage at input 313 returns to the voltage set by potentiometer R31 when conductor 311 is a logic high.

When the signal at conductor 311 changes from a logic low to a logic high, timer circuit 330 deactivates relay 360. When relay 360 is deactivated, ice maker 14 is turned off. When conductor 311 provides a logic low, timer circuit 335 activates relay 360 (coil 362 is energized). The energizing of coil 362 throws switch 380 so that a signal is provided on conductors 362 and 361 which turns ON ice maker 14.

Timer 335 preferably operates to provide superior drive capability for energizing and de-energizing coil 367. Also, timer 335 ensures that ice maker 14 is not immediately turned OFF after it has been turned ON so that unnecessary ON/OFF cycling of ice maker 14 is prevented. Unnecessary ON/OFF cycling of ice maker 14 may cause the clock motor (not shown) or cam mechanism (not shown) to malfunction.

Preferably, a 120 VAC source is coupled with conductor 366. Conductor 361 is preferably coupled to a neutral input of ice maker 14, and conductor 367 is preferably coupled with a 120 VAC input of ice maker 14. When coil 362 is de-energized, switch 380 couples conductor 362 to conductor 361 or is held open. When coil 362 is energized, switch 380 couples conductor 366 (120 VAC) so that conductor 362 receives a 120 VAC signal. The 120 VAC signal preferably provides power to ice maker 14 so that ice maker 14 is turned ON.

Control circuit 131 and capacitive sensing module 18 may be easily installed in an existing freezer unit 10. Capacitive plates 118 are mounted to rear wall 26 of freezer unit 10 by utilizing an adhesive or screws. Control circuit 131 is preferably mounted near other electronic circuitry in freezer unit 10. Preferably, the existing power conductors (not shown) for ice maker 14 are wired through switch 380 (conductors 361 and 367) as shown in FIG. 5. Preferably, conductor 366 of relay 360 is coupled to the power conductor of freezer unit 10 (120 VAC). Alternatively, conductor 366 may be coupled to the power source of ice maker 14. Therefore, the configuration of control circuit 131 and capacitive sensing module 18 advantageously allow the retrofitting of existing freezer units 10. With this approach, capacitive sensing module 18 and control circuit 131 may be installed without having to remove ice maker 14 or engage the existing clock motor and cam mechanism associated with the ice maker 14.

Capacitive sensing module 18 may be configured for specific ice bucket geometries by changing the configuration of plates 18, 22 and 24. Further, control circuit 131 may include features such as vacation shut-down loads and variable harvest rates that are time-of-day dependent or activity dependent with the installation of timing circuitry or switches. For example, control circuit 131 may include a microcontroller including software or other logic circuitry for implementing vacation shut-down loads and variable harvest rates. The variable harvest rates may be implemented by shutting ice maker 14 off for short periods of time to decrease the harvest rate of ice maker 14.

Figure 6:
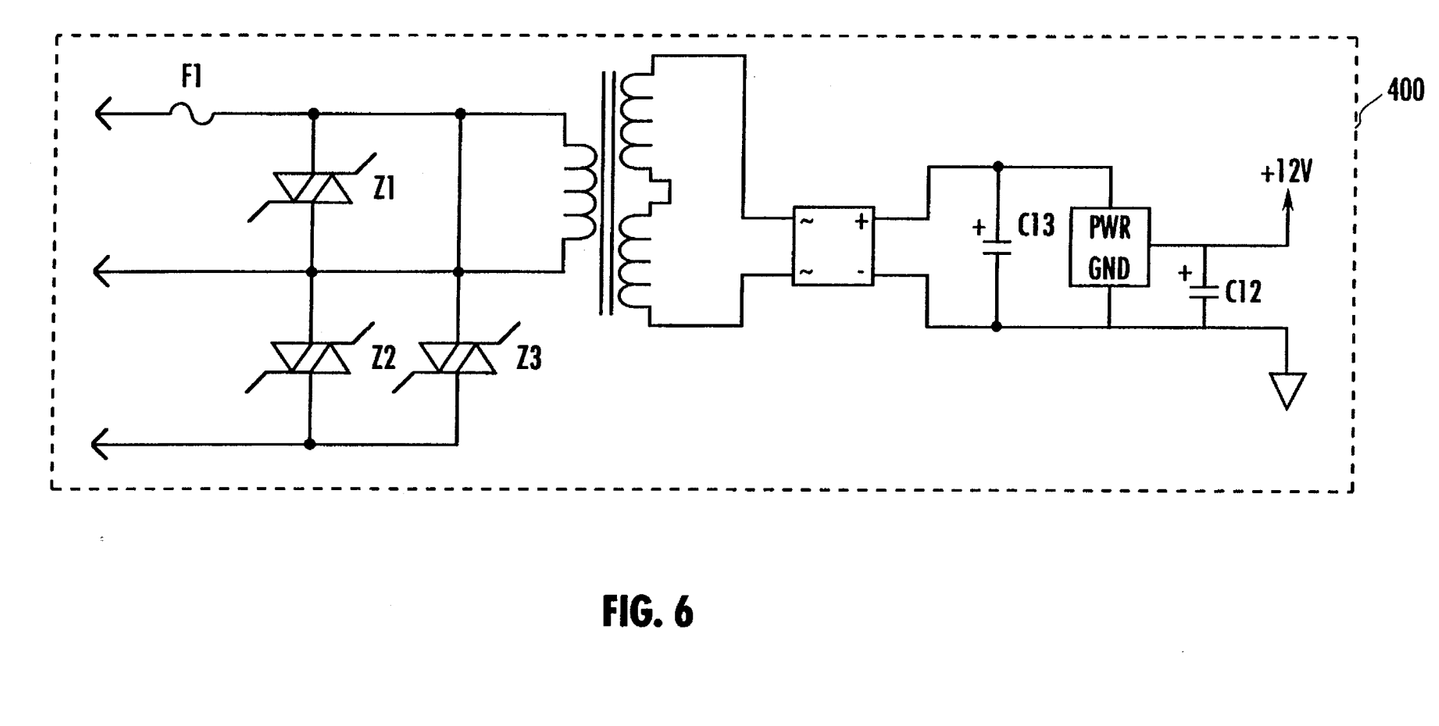
FIG. 6 is an electrical schematic diagram of a power supply for use in the capacitive sensor illustrated in FIG. 3.

With reference to FIG. 6, a power supply 400 for control circuit 131 is shown. The power supply is couplable to the 120 VAC power source for freezer unit 10 and provides a 12 VDC for control circuit 131. The preferred component values and arrangement components for the various circuits are illustrated in FIG. 3–6 and provided in Table I below. Preferably, operational amplifiers 241, 242, 243 and 312 are from a quad pack of operational amplifiers such as TLC 274 CMOS precision operational amplifier package (FIGS. 4 and 5).

It will be understood that, while the detailed drawings and specific examples given describe the preferred exemplary embodiments of the present invention, they are for the purpose of illustration only. The apparatus and method of the invention is not limited to the precise details and conditions disclosed. For example, although a particular configuration of capacitive plates is shown, other configurations are possible. Also, although specific ice buckets and freezer units are shown, the invention may be configured for other shapes or sizes. Further, single lines in the various drawings may represent multiple conductors. Various changes may be made to the details disclosed without departing from the spirit of the invention which is defined by the following claims.

TABLE I

| Component | Value | Component | Value | Component | Value |
|---|---|---|---|---|---|
| R1 | 20.0K | R16 | 22M | R31 | 10K |
| R2 | 10.0K | R17 | 20.0K | C1 | .05 MF |
| R3 | 100K | R18 | 20.0K | C2 | 1000 uF |
| R4 | 1M | R19 | 20.0K | C3 | .033 MF |
| R5 | 10K | R20 | 10.0K | C4 | 100 pF |
| R6 | 10K | R21 | 10.0K | C5 | 120 pF |
| R7 | 10K | R22 | 100.0K | C6 | 3–40 pF |
| R8 | 1M | R23 | 100.0K | C7 | 1 uF |
| R9 | 22M | R24 | 2.00K | C8 | 1 uF |
| R10 | 22M | R25 | 1.00M | C9 | .05 pF |
| R11 | 22M | R26 | 1.00M | C10 | 1 uF |
| R12 | 22M | R27 | 100K | C11 | 100 uF |
| R13 | 22M | R28 | 1M | D1 | 1N4001 |
| R14 | 22M | R29 | 10.0K | | |
| R15 | 22M | R30 | 10.0K | | |

We claim:

1. A control circuit for an ice cube maker, said ice cube maker providing said ice cubes to a bucket, the control circuit comprising:

a capacitive sensor configured to provide a sense signal related to the amount of said ice cubes in said bucket; and a compare circuit coupled with said capacitive sensor to receive said sense signal, said compare circuit providing a full signal when said sense signal is above a predetermined threshold, said compare circuit utilizing synchronous detection to provide noise immunity for said sense signal.

2. The control circuit of claim 1 wherein said compare circuit includes a relay switch controlled by said full signal.

3. The control circuit of claim 1 wherein said switch is a semiconductor switch.

4. The control circuit of claim 1 wherein said capacitive sensor further comprises a capacitive bridge.

5. The control circuit of claim 4 wherein said capacitive sensor further comprises a drive circuit for providing a pulsing signal to said capacitive bridge, said capacitive bridge having a first branch and a second branch, said first branch providing a first signal in response to said pulsing signal and said second branch providing a second signal in response to said pulsing signal; and a comparator receiving a difference signal indicative of a difference between said first signal and said second signal, said comparator providing said full signal when said difference signal is in a predetermined relationship with said predetermined threshold.

6. The control circuit of claim 5 wherein said pulsing signal is a square wave.

7. The control circuit of claim 1 wherein said capacitive sensor includes a first plate disposed parallel to a first level, a second plate disposed parallel to a second level, and a third plate disposed parallel to a third level.

8. The control circuit of claim 7 wherein said capacitive sensor includes a capacitive bridge having a first branch comprised of a first capacitor, a second branch comprised of a second capacitor, a third branch comprised of said first and second plates, and a fourth branch comprised of said second and third plates.

9. The control circuit of claim 8 wherein said third level is said predetermined level.

10. The freezer unit of claim 8 wherein said third level is said predetermined level.

11. A freezer unit, comprising:

a freezer wall;

an ice cube maker, said ice cube maker providing ice cubes to an ice cube tray, said ice cube tray storing an amount of said ice cubes;

at least one capacitive plate located proximate said ice cube tray and outside said ice cube tray, said at least one capacitive plate being mounted on said freezer wall, said at least one capacitive plate changing capacitance in response to changes in said amount of said ice cubes stored in said tray; and a control circuit coupled with said ice cube maker and said capacitive plate, said control circuit monitoring said capacitance and providing a control signal when said capacitance indicates a particular amount of said ice cubes are stored in said ice cube tray.

12. The freezer unit of claim 11 wherein said at least one capacitive plate includes a plurality of capacitive plates arranged as part of a capacitive bridge.

13. The freezer unit of claim 12 wherein said control circuit provides a square wave signal to said capacitive bridge, said capacitive bridge providing a capacitance signal in response to said square wave signal, said control circuit including a comparator receiving said capacitance signal, said comparator providing said control signal when said capacitance signal is in a predetermined relationship with a threshold.

14. The freezer unit of claim 11 wherein said capacitive plates include a first plate disposed parallel to a first level, a second plate disposed parallel to a second level, and a third plate disposed parallel to a third level.

15. The freezer unit of claim 14 wherein said capacitive plates are part of a capacitive bridge having a first leg comprised of a first capacitor, a second leg comprised of a second capacitor, a third leg comprised of said first and second plates, and a fourth leg comprised of said second and third plates.

16. An improved ice maker for use in a freezer unit having a freezer wall, said ice maker having a tray and a level sensor, said ice cube maker making ice and providing said ice to said tray, said ice maker receiving a control signal from said level sensor, said level sensor providing said control signal when a level of said ice in said tray exceeds a predetermined level, said ice maker improved in that said level sensor is a non-contact sensor, located outside of said tray, and wherein said level sensor is configured to be affixed to said freezer wall of said freezer unit.

17. The improved ice maker of claim 16 wherein said non-contact sensor is a capacitive sensor further comprising a drive circuit for providing a pulsing signal to a capacitive bridge, said capacitive bridge providing a capacitance signal in response to said pulsing signal; and a comparator receiving said capacitance signal, said comparator providing said control signal when said capacitance signal is in a predetermined relationship with a threshold.

18. The improved ice maker of claim 17 wherein said capacitive sensor includes a first plate disposed parallel to a first level, a second plate disposed parallel to a second level, a third plate disposed parallel to a third level.

19. The improved ice maker of claim 16 wherein said capacitive sensor includes a capacitive bridge having a first branch comprised of a first capacitor, a second branch comprised of a second capacitor, a third branch comprised of said first and second plates, and a fourth branch comprised of said second and third plates.

20. The improved ice maker of claim 19 wherein said first branch is coupled between said second branch and said fourth branch, said second branch is coupled between said first branch and said third branch, said third branch is coupled between said second branch and said fourth branch, and said fourth branch is coupled between said first branch and said third branch.

21. The improved ice maker of claim 19 wherein said level sensor includes a control circuit, said control circuit providing a drive signal to said capacitive bridge and receiving a sense signal, said control circuit transforming said sense signal to a unipolar sense signal.

22. An improved ice maker having a tray and a level sensor, said ice cube maker making ice and providing said ice to said tray, said ice maker receiving a control signal from said level sensor, said level sensor providing said control signal when a level of said ice in said tray exceeds a predetermined level, said ice maker improved in that said level sensor is a non-contact sensor, wherein said level sensor utilizes synchronous detection to provide noise immunity.

23. The method of installing a level sensor as recited in claim 22, wherein said control circuit includes a relay switch, and said relay switch is coupled between said power input conductors and said AC power conductors.

24. A method of installing the level sensor in a freezer unit, the freezer unit including AC power conductors, a bucket, and an ice maker having power input conductors, the level sensor comprised of a control circuit and capacitive plates, the method comprising the steps of:

affixing said capacitive plates proximate said bucket in said freezer unit;

coupling said power input conductors of said ice maker to said control circuit; and coupling said AC power conductors to said control circuit, wherein said capacitive plates are affixed to a freezer wall in said freezer unit.

25. The method of installing a level sensor as recited in claim 24, wherein said capacitive plates are arranged in a capacitive bridge.

26. The method of installing a level sensor as recited in claim 24, wherein said capacitive plates include a first capacitive plate, a second capacitive plate and a third capacitive plate, wherein said first capacitive plate is installed at the same horizontal level as the bucket.

* * * * *